…

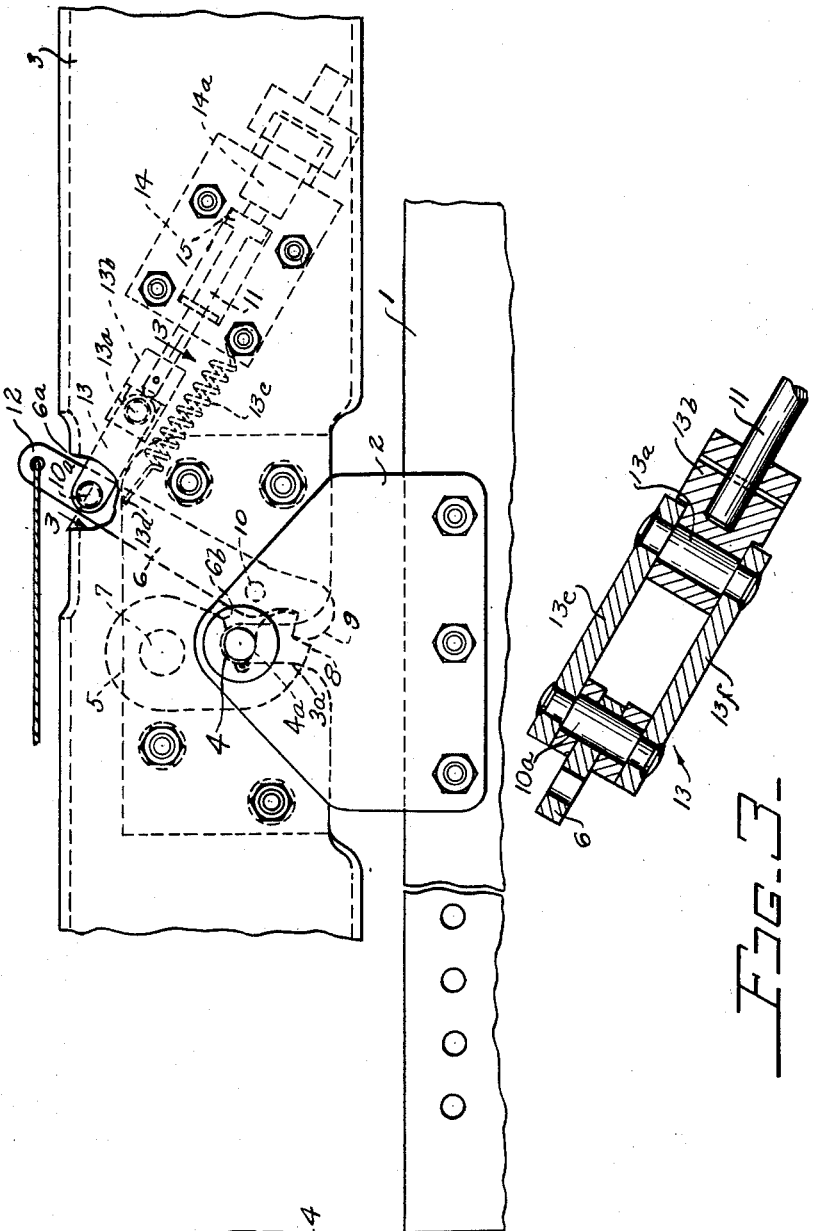

United States Patent Office 2,952,489
Patented Sept. 13, 1960

2,952,489
EXPLOSIVE/MECHANICAL, SINGLE MOUNT, BOMB RACK

Francis M. Johnson, Dayton, Ohio, assignor to the United States of America as represented by the Secretary of the Air Force Filed Apr. 19, 1956, Ser. No. 579,418

5 Claims. (Cl. 294—83)

(Granted under Title 35, U.S. Code (1952), sec. 266)

The invention described herein may be manufactured and used by or for the United States Government for governmental purposes without payment to me of any royalty thereon.

This invention relates to a quick release device, and more particularly, to a quick release device for the suspension of stores, bombs, tanks and other objects from an aircraft.

The development of modern high speed fighter aircraft and long range high altitude bombers has led to an ever increasing need for suspension systems whereby various auxiliary and primary objects may be carried by such aircraft. This need led to the development of an effective and simple release mechanism—one that enables the aircraft pilot to rapidly jettison or release said objects when desired. Thus, a simple and unique mounting system is required where the suspension and quick release of auxiliary loads is facilitated and, at the same time, a complete separation is assured.

It is an object of the present invention, therefore, to provide a rack incorporating a simple and effective release device for the suspension of a variety of auxiliary objects, as for example, stores, bombs, fuel tanks, airborne lifeboats, "parasite" aircraft, missiles and other jettisonable loads.

It is a further object of the invention to utilize a quick release device unique in design and yet dependable in operation.

It is a still further object of the invention to attach a quick release mechanism either beneath the wing of an aircraft or from within the aircraft itself.

Another object of the invention resides in a control for a release mechanism that may be either power actuated or manually released.

An additional object of the invention is to provide a load-supporting bracket which is suspended at a single point from the aircraft support rack and is released either by means of an explosive squib remotely controlled by the aircraft pilot or by manual control at the device itself.

Other objects and advantages of the invention will become apparent from the following description, taken in connection with the accompanying drawings, in which like reference characters refer to like parts in the several figures.

Fig. 1 is a side elevation of the release mechanism utilized in the invention showing part of the load supporting flange.

Fig. 2 is an end view of the mechanism of Fig. 1, showing details of the load-supporting bracket and main support rod.

Fig. 3 is a sectional view taken at 3—3 of Fig. 1 showing details of the intermediate link.

Referring particularly to Fig. 1 of the drawings, a bracket 2 is supported on a supporting plate or flange 1 which has been previously attached to any desired object, as for example, an auxiliary fuel tank, a bomb, or some other material such as stores. Said bracket 2 is suspended from the rack 3 by means of the quick release mechanism hereinafter described.

As seen in Fig. 2, the bracket 2 consists of two separate plates, 2a and 2b, respectively, each of which is secured on opposite sides of the supporting plate or flange 1. Each of said plates consists of a first straight portion affixed to said flange, an intermediate curved portion and a second straight portion extending above said flange, said straight portions being parallel to each other with the distance between the second parallel portions greater than that between the first parallel portions. Between said second parallel portions of said plates 2a and 2b and bolted thereto is mounted a main supporting rod or bar 4. It is this latter element to which the release mechanism of the rack 3 is positively engaged.

The rack 3 comprises a primary member in the shape of an inverted U as seen in Fig. 2 to which member the release mechanism of the subject invention is supported. Said release mechanism comprises two hinged hook-nosed arms 5 and 6, the former having a cut-out or half-circle portion 4a into which portion the supporting rod or bar 4 engages when in the suspended or locked position. The first arm 5 is hinged at its upper end about the pivot point 7 to the rack 3 and includes a hook-shaped projecting nose 8 which engages with the complementary hook shaped projecting nose 9 at the bottom end of the second arm 6 (as seen clearly in Fig. 1). Said second arm 6 is hinged about pivot point 10 at a point near its projecting nose 9. The opposite end of said second arm 6 extends through an opening 6a in the upper surface of the rack 3 to terminate in a handle 12. A piston rod 11 is pivotally connected to said second arm 6 by an intermediate link 13, the latter being pivotally connected to said piston rod at one end thereof and at its other end to said second arm 6 at pivot point 10a which is near the upper end of said arm. The link 13 is pivotally connected to said piston rod 11 by means of the intermediate member 13b which is rigidly fixed at one end (the right hand end as seen in Fig. 1) to said piston rod 11 and is rotatably engaged with said link 13 at its other end by means of a pivot 13a. Said intermediate member 13b is in the form of a rectangular block with a recessed or cut-out portion at said other end for approximately one-half its total length. This recessed or cut-out portion provides a base for one end of said intermediate link 13 and it is to this base that the latter is pivotally mounted by means of said pivot 13a. The recessed portion is of sufficient depth so that the top of said link 13 extends slightly above the top of said intermediate member 13b. Further, one end of a return spring 13c is affixed to the cylinder 14 as illustrated in Fig. 1, whereas the other end of said spring 13c is connected to the arm 6 at the point 13d. Thus, the locking arm 6 is normally held in the locked position under tension of the return spring 13c. The latter is sufficiently tensioned to positively engage with and firmly lock the projecting hook nose 9 of the arm 6 with the complementary projecting hook nose 8 of the load-support arm 5 and thereby retain the desired load or object in the suspended position. Said piston rod 11 comprises part of the power means for actuating said release mechanism, the details of which will be hereinafter described.

With particular reference to Fig. 3, a more detailed showing of said intermediate member 13b is illustrated. The recessed or cut-out portion previously mentioned provides a narrower portion in the left half of said member 13b. The intermediate link 13 consists of a link 13e and a link 13f seated, respectively, in said recessed or cut-out portion of the member 13b. Said links 13e and 13f are pivotally mounted in said recessed portion by the pivot 13a. A similar pivot arrangement is provided for the other end of said link 13 wherein the pivot 10a pivotally connects the links 13e and 13f to the locking arm 6.

The power means for operating the release mechanism of the instant invention consists of a cylinder 14 that incorporates an explosive squib 14a and a piston 15 to which the piston rod 11 hereinbefore mentioned is affixed. Said piston rod 11 is, in turn, connected to the intermediate link 13 by the intermediate member 13b which is fixedly secured to said link as previously described. The explosive squib may be incorporated in said cylinder 14 and fired in any desired manner since the specific details are not important to the present invention. The first arm 5 also includes an abutment or abutting surface at 6b adjacent its projecting nose 8. The function of said abutment or abutting surface 6b will be hereinafter explained with reference to the actuation of the release mechanism.

The load support arm 5 is normally retained in its vertical or locked position by the engagement of its projecting hooked nose 8 with the complementary hooked nose 9 of the locking arm 6 but is released therefrom on counterclockwise rotation of said locking arm 6 to drop the specific object or load on which the bar 4 is ultimately mounted.

An additional characteristic of the invention resides in the semiautomatic operation of the arms 5 and 6. As a result of this feature, a new load may be suspended semiautomatically from the release mechanism of the instant device with a minimum of wasted motion by the technician or other personnel assigned to the loading operation. As the bomb or auxiliary fuel tank, for example, is initially elevated prior to its attachment to said release mechanism, the main support bar 4 mounted thereon is directed into the appropriate guide channel or slot 3a (seen in Fig. 1) at which point it strikes against projecting nose 9 and cams arm 6 to one side and is lifted upwardly until it strikes against the abutment or abutting surface 6b on the arm 5. This latter action causes said arm 5 to rotate in the counterclockwise direction to bring its hook or cut-out portion 4a directly beneath the bar 4. Simultaneously, once the bar 4 has cleared the projecting nose 9 of the arm 6 in its upward movement in the channels or slots 3a, said arm 6 is rotated or urged in the reverse or clockwise direction under action of spring 13c to engage the complementary hook noses 8 and 9 and thereby once again lock the main support bar 4 and the load carried thereby in the suspended position. At this point it is noted that the tension spring 13c which positively rotates the arm 6 in the clockwise direction to return its projecting nose 9 to engagement with the projecting nose 8 on the arm 5 is an optional feature and may be eliminated. If this spring is omitted, then on release of the desired load, said arm 6 will remain in its released position until a new load is suspended as previously described hereinbefore in which event the arm 6 must be returned to its cocked or locking position. On the other hand, if the tension spring 13c is utilized then after release of the particular load, the arm 6 will return to its original or locking position to be cammed to one side as previously explained when a new load is to be suspended. Of course, at this point it will not engage with the arm 5 since the latter has been rotated out of its vertical position during the previous release operation. In this latter event, a new load is suspended in the same manner as previously described except that during the initial elevation of the main support bar 4 through the guide channel or slot 3a, said bar will engage with the projecting nose 9 of said arm 6 and cam it out of the way against the action of tension spring 13c as hereinbefore described, said arm 6 returning to its original position after said bar has cleared the path. A second exception occurs during the return of the arm 5 to its vertical position at which point said arm 5 will not engage with the arm 6 since the latter has already been rotated by the spring 13c. It is recalled that the arm 5 is rotated by the engagement of the bar 4 with the abutment or abutting surface 6b. During the latter part of this rotation of the arm 5 its projecting nose will snap into engagement with the projecting nose of the arm 6 against the tension of spring 13c and thus again lock the bar 4 and its auxiliary load in the suspended position. It is noted that after the release of a load from its suspended position, the arm 5 shifts sufficiently in the clockwise direction to a rest position to enable the rod 4 to be elevated upwardly in slots 3a in the manner described above for the suspension of a new load. In other words, the arm 5 and more specifically its projecting nose portion 8 has shifted to the left as viewed in phantom in Fig. 1 to substantially "clear" the slots 3a, since said arm 5 inherently incorporates sufficient material relative to its pivot 7 to ensure that it normally hangs in a predetermined position to the left of the vertical for the purpose previously explained.

To summarize the complete power operation of the quick release mechanism of the present invention, first, the explosive squib mounted in the cylinder 14 is fired by any suitable electrical system under remote control of the aircraft pilot, second, the expanding gases formed by said explosion act against the face of the piston 15 driving its piston rod 11 forward against the tension of the spring 13c or from right to left as viewed in the drawings, third, the locking arm 6 is rotated about its pivot point 10 in the counterclockwise direction by its connection to said piston rod 11 to release its projecting nose 9 from engagement with the projecting nose 8 of the load support arm 5, and, last, the particular load or object carried by said rack 3 is dropped by virtue of the normally locked main supporting rod or bar 4 being released from said engagement in the hooked or cut-out portion 4a of the now-rotating load-support arm 5. Moreover, said release mechanism may also be manually actuated by means of the handle 12 should there be a failure or malfunction in the power mechanism or should it be desired to release the object or load carried thereby without firing the explosive squib. Operation of said handle 12 to rotate the locking arm 6 in the counterclockwise direction will effect a release in the same manner as previously described for power operation.

Thus, a simple and unique quick release mechanism has been developed to effect a dependable power or manual release of auxiliary loads carried either from within an aircraft or suspended from the aircraft wing.

I claim:

1. A rack for the releasable suspension of an auxiliary load comprising a main support member incorporating a pair of spaced and parallel, depending elongated slots therein, a quick-release mechanism attached to said main support member, and an auxiliary load releasably carried by said release mechanism, said release mechanism comprising two pivotally mounted arms, each of said arms having a projecting hook nose in complementary engagement with one another to lock one of said arms in the vertical or load-supporting position, and a main support bar attached to said auxiliary load in abutting engagement between the hook portion of said vertically locked arm and one edge of said pair of depending slots, said vertically locked arm having a peripheral abutment surface adjacent the upper surface of said hook portion for engagement by said main support bar to positively pivot said vertically locked arm to load-supporting position when a new load is suspended therefrom, said release mechanism further comprising a power device interconnected with the other of said arms to rotate the latter to disengage said projecting hook noses and thereby unlock said vertically locked arm to normally release said main supporting bar and the suspended load carried thereby.

2. A wing rack for the releasable suspension of an auxiliary load in combination with a quick-release mechanism comprising a main supporting rack, a load-support arm and a locking arm pivotally mounted on said rack, said load-support arm having a complementary hook shaped projecting nose portion substantially supporting the auxiliary load and said locking arm having a complementary hook shaped projecting nose portion in latching engagement with the complementary nose portion of said load support arm in one position thereof and disengaged therefrom in a second position thereof to release said load, first means attached to the locking arm to pivot said locking arm out of engagement with said load-support arm to release said load, and second means attached to said locking arm to resiliently return said locking arm to its latching position with said load support arm, said load support arm having a recessed portion above said complementary projecting nose portions to slidably engage with said auxiliary load, the pivot of said load support arm being out of vertical alignment with the axis of support of said auxiliary load in said recessed portion, and resilient means for automatically returning said locking arm to its initial latching position on release of said auxiliary load from said main rack, said load support arm being returned to its load support position on suspension of a new load in the recessed portion thereof.

3. In a releasable load support, a load supporting rack member having spaced side plates formed with a pair of spaced, parallel upwardly extending vertical slots therein for slidably receiving a load carrying bar member upwardly therein, a pair of hook arms comprising a main load carrying arm pivoted intermediate the side plates above and at one side of a vertical plane through said upwardly extending vertical slots and a latch arm pivoted intermediate the side plates adjacent the upper portion of said vertically extending slots and at the opposite side of said vertical plane, said arms having complementary hook shaped projecting nose portions in complementary engagement with each other when in the load carrying position, said load carrying arm having a recessed portion adjacent the upper portion of said vertically extending slots below its pivot for engaging and supporting said load carrying bar member in said slots and formed with an abutting surface thereon movable alongside the top of said recessed portion when said latch arm is moved to an inoperative position to release said bar member for displacing engagement with said bar member during upward movement thereof in said slots to return said load carrying arm to an operative engaged position with said latch arm, and power means for pivoting said latch arm disengaging said complementary hook shaped projecting nose portions to release said bar member from said recessed portion.

4. In a releasable support for the support of an auxiliary load, a support rack and a quick-release mechanism mounted on said rack, said quick-release mechanism comprising two hinged arms, one of said arms hinged to said rack about a pivot at its upper end and the other of said arms hinged to said rack about a pivot near its lower end, said first-named arm incorporating a load-supporting slot adjacent its lower end and having a hook-shaped projecting nose portion at its end remote from its pivot, said last-named arm incorporating a complementary hook-shaped projecting nose portion at its end adjacent to its pivot in engagement with the hook-shaped projecting nose portion of said first-named arm, said second-named arm extending through an opening in the upper surface of said rack to terminate in a handle portion, an auxiliary load-support member in engagement with said load supporting slot to releasably suspend said auxiliary load therefrom, and means interconnected with the upper end of said second-named arm below said opening pivoting said second-named arm between a locked and an unlocked position, said means comprising a spring normally urging the hook shaped projecting nose portion of said second-named arm in complementary engagement with the hook shaped projecting nose portion of said first-named arm at a point substantially directly below said load-support member to retain said auxiliary load-support member in supporting engagement in said load supporting slot, the axis of said load-support member slightly off-center of the axis of the pivot of said first-named arm, and power means attached to said second-named arm at a point adjacent said handle portion operating to pivot said second-named arm disengaging said complementary hook-shaped projecting nose portions to release said load-support member from the load-supporting slot of said first-named arm.

5. In a releasable support as in claim 4, said power means comprising a cylinder, an explosive squib mounted in said cylinder, a piston in said cylinder adjacent to said squib, a piston rod, an intermediate link connected to said piston rod, and an interconnecting member between said intermediate link and said second-named arm pivoting said second-named arm to disengage said complementary projecting nose portions.

References Cited in the file of this patent
UNITED STATES PATENTS

| | | |
|---|---|---|
| 1,338,724 | Gledhill | May 4, 1920 |
| 1,383,252 | Wearham | June 28, 1921 |
| 2,443,629 | Matuszewski | June 22, 1948 |
| 2,625,423 | Hight | Jan. 13, 1953 |